US010818427B2

(12) United States Patent
Manz et al.

(10) Patent No.: US 10,818,427 B2
(45) Date of Patent: Oct. 27, 2020

(54) STATOR ASSEMBLY INCLUDING A BOBBIN HAVING AN EXTENSION TAB AND A RETENTION RIB

(71) Applicant: REGAL BELOIT AMERICA, INC., Beloit, WI (US)

(72) Inventors: Alan Jacob Manz, Paulding, OH (US); Joseph Aaron Henry, Dayton, OH (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 339 days.

(21) Appl. No.: 15/870,123

(22) Filed: Jan. 12, 2018

(65) Prior Publication Data

US 2019/0221361 A1 Jul. 18, 2019

(51) Int. Cl.
| | | |
|---|---|---|
| *H01F 27/32* | (2006.01) | |
| *H01F 27/30* | (2006.01) | |
| *H01F 5/02* | (2006.01) | |
| *H01F 5/04* | (2006.01) | |
| *H02K 3/52* | (2006.01) | |
| *H02K 1/18* | (2006.01) | |

(52) U.S. Cl.
CPC .............. *H01F 27/325* (2013.01); *H01F 5/02* (2013.01); *H01F 5/04* (2013.01); *H01F 27/306* (2013.01); *H02K 1/182* (2013.01); *H02K 3/522* (2013.01); *H02K 2203/12* (2013.01); *H02K 2213/03* (2013.01)

(58) Field of Classification Search
CPC ........... H01F 27/325; H01F 5/04; H02K 3/32; H02K 3/34; H02K 3/345; H02K 2203/12

USPC .................................................. 181/208, 214
See application file for complete search history.

(56) References Cited

U.S. PATENT DOCUMENTS

| | | | |
|---|---|---|---|
| 6,844,653 B2 | 1/2005 | Kolomeitsev et al. | |
| 6,853,284 B2 * | 2/2005 | Nagai ................... | H01F 27/325 336/183 |
| 6,958,673 B2 * | 10/2005 | Suzuki .................. | H01F 27/022 336/198 |
| 7,569,958 B2 * | 8/2009 | Matsuzaki ............. | H02K 3/524 310/71 |

(Continued)

FOREIGN PATENT DOCUMENTS

| | | | | |
|---|---|---|---|---|
| JP | 2013135541 A | * | 7/2013 | ............. H02K 3/521 |
| JP | 2019075952 A | * | 5/2019 | ............... H02K 1/14 |

OTHER PUBLICATIONS

Pending U.S. Appl. No. 62/527,285, filed Jun. 30, 2017.
Pending U.S. Appl. No. 15/408,088, filed Jan. 17, 2017.

*Primary Examiner* — Jeremy A Luks
(74) *Attorney, Agent, or Firm* — Armstrong Teasdale LLP

(57) ABSTRACT

A bobbin assembly for use in a stator assembly for a motor assembly having an axis of rotation is provided. The bobbin assembly includes a conductor coil comprising a radially inner end and a radially outer end. The bobbin assembly also includes a bobbin including a body portion having a first end and a second end, wherein the conductor coil is coupled about the body portion. The bobbin also includes a first flange coupled to the first end, a second flange coupled to the second end, and an extension tab formed on one of the first flange or the second flange. The extension tab extends radially beyond one of the radially inner end or radially outer end of the conductor coil.

22 Claims, 6 Drawing Sheets

(56) References Cited

U.S. PATENT DOCUMENTS

| | | | |
|---|---|---|---|
| 7,663,287 B2 * | 2/2010 | Haga | H02K 3/325 |
| | | | 310/260 |
| 7,808,146 B2 | 10/2010 | Fujii | |
| 8,604,660 B2 | 12/2013 | Elser | |
| 9,601,960 B2 | 3/2017 | Hino et al. | |
| 9,670,030 B2 | 6/2017 | Kim et al. | |
| 10,530,210 B2 * | 1/2020 | Tokoi | H02K 3/34 |
| 2007/0001534 A1 * | 1/2007 | Kojima | H02K 1/14 |
| | | | 310/156.37 |
| 2016/0268866 A1 * | 9/2016 | Matsumoto | H02K 21/24 |
| 2017/0093244 A1 * | 3/2017 | Tokoi | H02K 21/24 |
| 2017/0194823 A1 * | 7/2017 | Tokoi | H02K 1/20 |
| 2018/0254680 A1 * | 9/2018 | Sakurai | H02K 15/105 |
| 2018/0351419 A1 * | 12/2018 | Sakai | H02K 1/17 |
| 2019/0157935 A1 * | 5/2019 | Yoneoka | H02K 3/325 |
| 2019/0245418 A1 * | 8/2019 | Takahashi | H02K 3/522 |

* cited by examiner

STATOR ASSEMBLY INCLUDING A BOBBIN HAVING AN EXTENSION TAB AND A RETENTION RIB

BACKGROUND

The field of the disclosure relates generally to electric motors, and more specifically, to electric motors that include a stator assembly and insulation members to insulate components of the stator assembly from electric current flowing through conduction coils.

At least some known electric motors include a stator assembly having a plurality of teeth and conduction coils wrapped around the teeth. In at least some known stator assemblies, the conduction coils are supported by bobbins positioned on the teeth. Electric current is provided to the conduction coils via wiring to generate an alternating magnetic flux that causes a rotor of the motor to rotate. In at least some known motors, the stator assembly is hand assembled and the wiring is routed, secured, and separated with a manual process using tape and lacing. This manual process results in an increased labor and materials costs. Additionally, in at least some known stator assemblies, the bobbins and conduction coils may be susceptible to undesired movement along the stator teeth during the varnishing process. Clamping the stator assembly between two plates may prevent the movement, but also increase the manufacturing time and costs.

BRIEF DESCRIPTION

In one aspect, a bobbin assembly for use in a stator assembly for a motor assembly having an axis of rotation is provided. The bobbin assembly includes a conductor coil comprising a radially inner end and a radially outer end. The bobbin assembly also includes a bobbin including a body portion having a first end and a second end, wherein the conductor coil is coupled about the body portion. The bobbin also includes a first flange coupled to the first end, a second flange coupled to the second end, and an extension tab formed on one of the first flange or the second flange. The extension tab extends radially beyond one of the radially inner end or radially outer end of the conductor coil.

In another aspect, a stator assembly for an electric motor assembly having an axis of rotation is provided. The stator assembly includes an annular body extending about the axis and a plurality of stator teeth extending axially from the annular body and spaced circumferentially about the annular body. The stator assembly also includes at least one bobbin coupled to a stator tooth of the plurality of stator teeth. The at least one bobbin includes a body portion defining an opening therethrough configured to receive the stator tooth. The body portion includes at least one retention rib configured to provide an interference fit between the stator tooth and the body portion.

Although specific features of various embodiments may be shown in some drawings and not in others, this is for convenience only. Any feature of any drawing may be referenced and/or claimed in combination with any feature of any other drawing.

DETAILED DESCRIPTION

Figure 1:
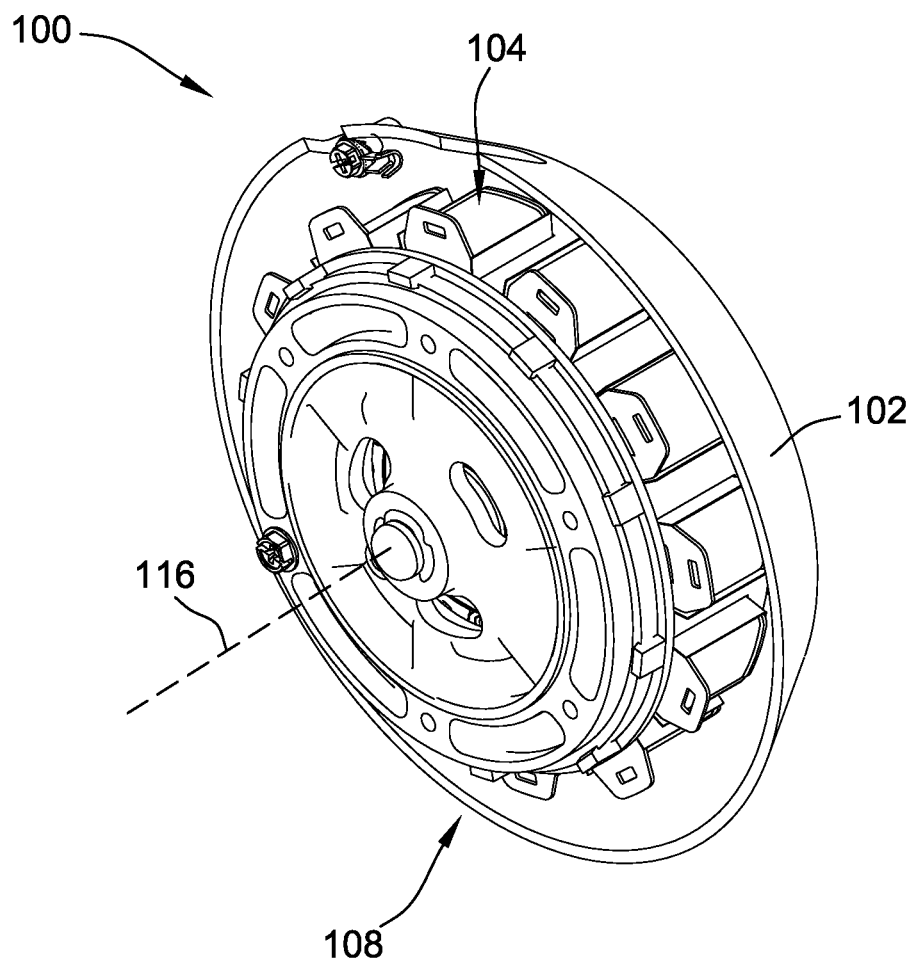
FIG. 1 is a perspective view of an exemplary electric motor assembly.
Figure 2:
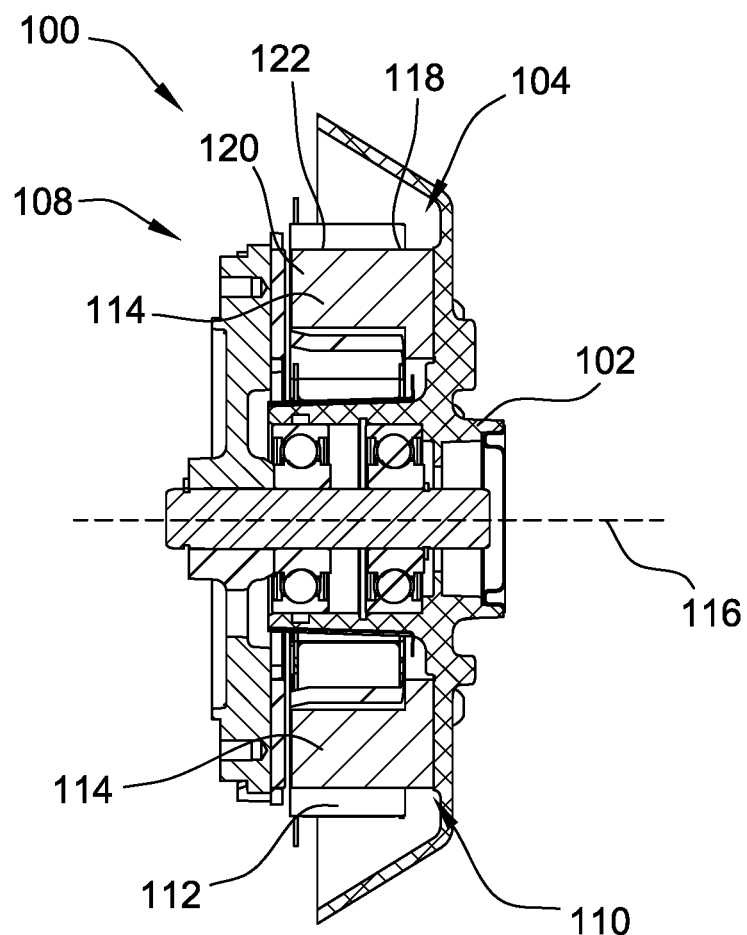
FIG. 2 is a cross-sectional view of the electric motor assembly shown in FIG. 1.

FIG. 1 is a perspective view an exemplary electric motor assembly 100. FIG. 2 is a cross-sectional view of electric motor assembly 100. In the exemplary embodiment, motor assembly 100 includes a motor housing 102, a stator assembly 104, and a rotor assembly 108. Stator assembly 104 includes a magnetic stator core 110 and a plurality of conduction coils 112. Each conduction coil 112 is coupled to one of a plurality of stator teeth 114. In some embodiments, motor assembly 100 includes one conduction coil 112 per stator tooth 114. In the exemplary embodiment, one conduction coil 112 is positioned on every other stator tooth 114. In operation, rotor assembly 108 is positioned adjacent stator assembly 104 and a voltage is applied to conduction coils 112 in sequence to cause rotation of rotor assembly 108. In alternative embodiments, electric motor assembly 100 has any configuration that enables electric motor assembly 100 to operate as described herein.

Figure 3:
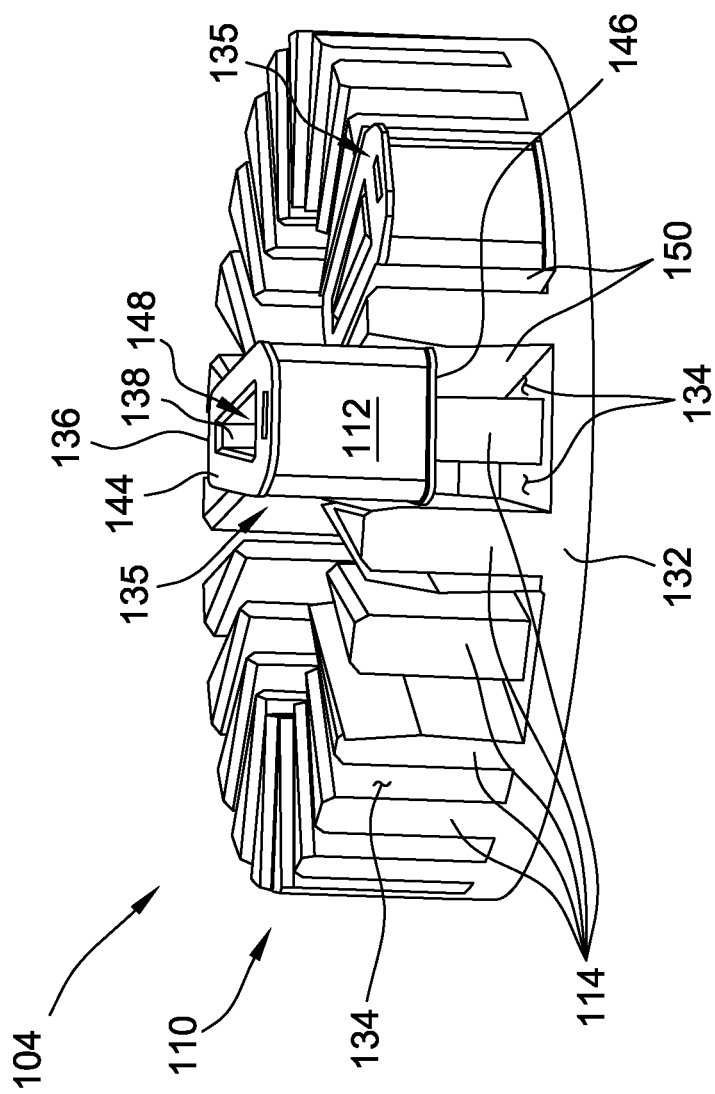
FIG. 3 is a perspective view of a partially assembled stator assembly of the electric motor assembly shown in FIG. 1.
Figure 4:
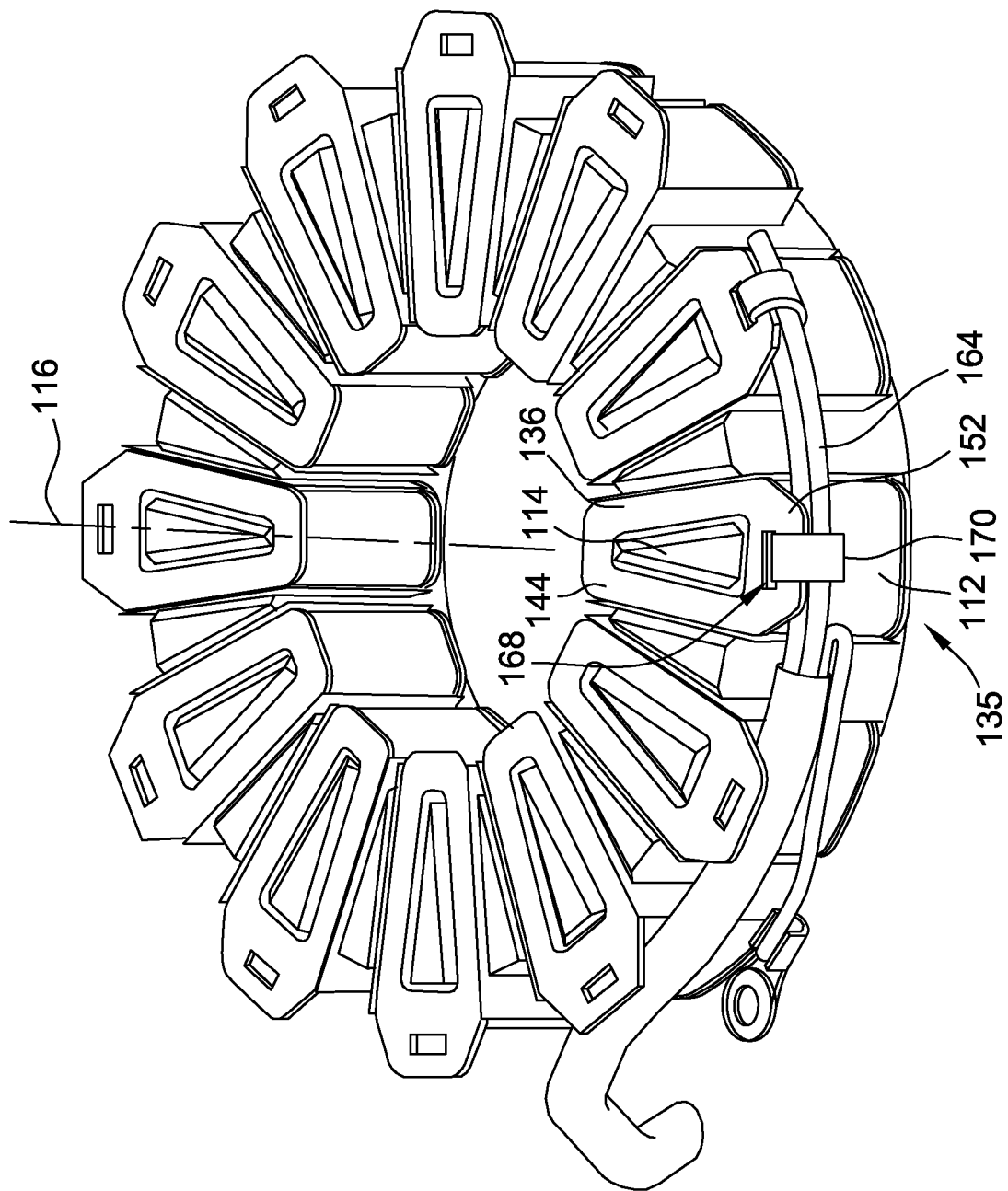
FIG. 4 is a perspective view of the stator assembly further along the assembly process of the electric motor assembly shown in FIG. 1.
Figure 5:
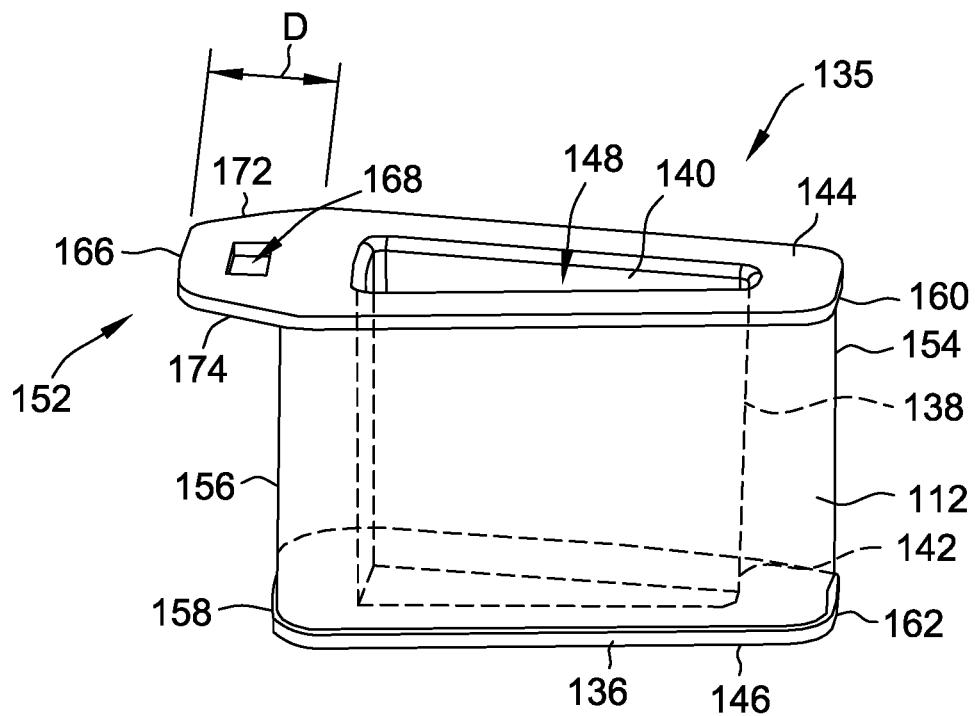
FIG. 5 is a perspective view of an exemplary bobbin assembly for use with the stator assembly shown in FIGS. 3 and 4.
Figure 6:
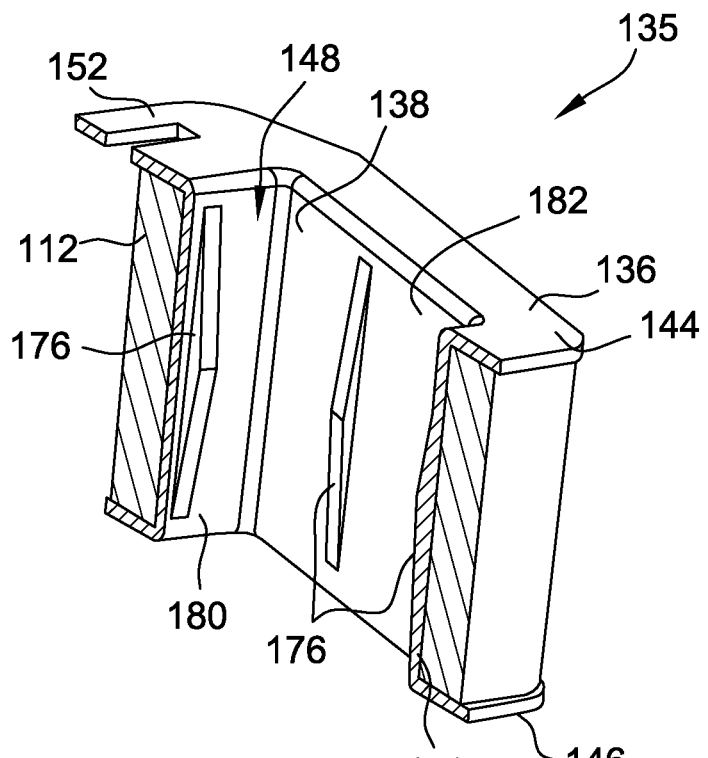
FIG. 6 is a cross-sectional view of the bobbin assembly shown in FIG. 5.
Figure 7:
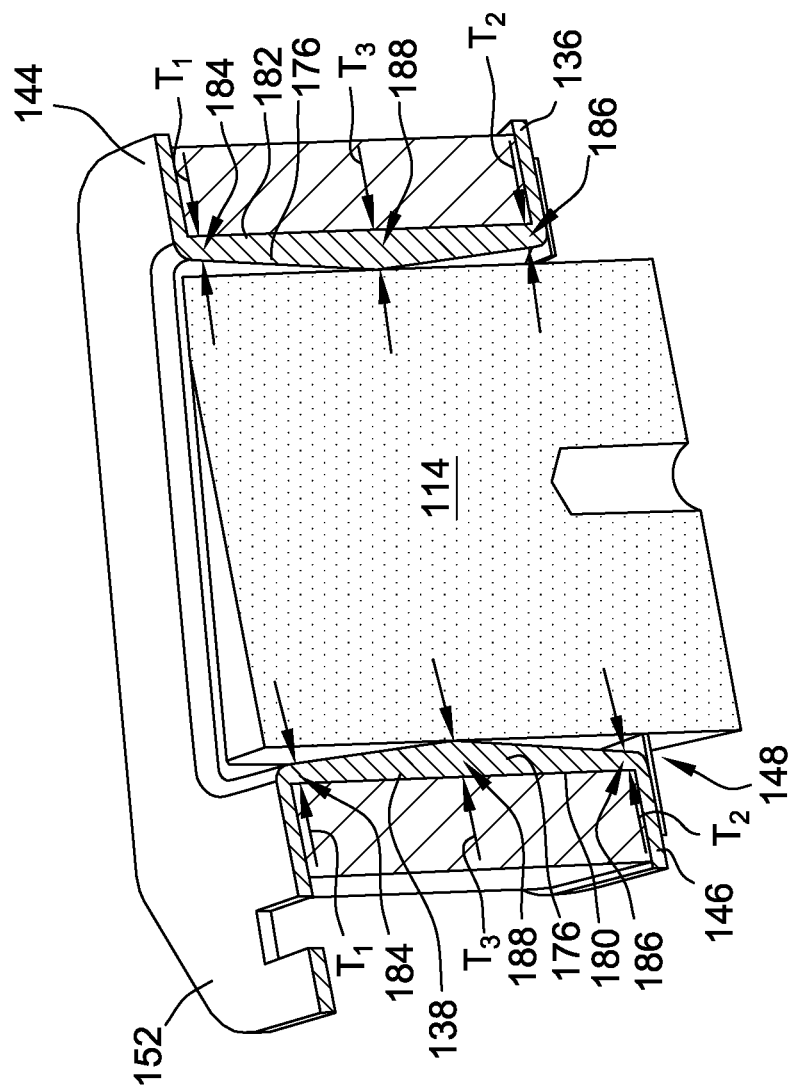
FIG. 7 is a cross-sectional view of the stator assembly shown in FIG. 4.

FIG. 3 is a perspective view of stator assembly 104 of electric motor assembly 100. FIG. 3 is a perspective view of partially assembled stator assembly 104 of electric motor assembly 100 (shown in FIG. 1). FIG. 4 is a perspective view of stator assembly 104 further along in the assembly process. FIG. 5 is a perspective view of an exemplary bobbin assembly 135 for use with stator assembly 104. FIG. 6 is a cross-sectional view of bobbin assembly 135. FIG. 7 is a cross-sectional view of stator assembly 104.

Stator assembly 104 includes an annular body or backplane 132 extending about axis 116. Stator teeth 114 extend axially from annular body 132. Stator teeth 114 are spaced circumferentially about annular body 132 and define slots 134 therebetween. Slots 134 are configured to receive bobbin assemblies 135. Each bobbin assembly 135 includes a conduction coil 112 positioned on a bobbin 136 that is configured to support conduction coil 112. As best shown in FIG. 5, each bobbin 136 includes a body portion 138 having a first end 140 and a second end 142. Bobbin 136 also includes a first flange 144 coupled to first end 140 and a second flange 146 coupled to second end 144. Specifically, each conduction coil 112 is wrapped around or coupled about body portion 138 of bobbin 136 between flanges 144 and 146. Additionally, body portion 138 defines a central opening 148 that receives one stator tooth 114. Bobbins 136 are coupled to every other stator tooth 114 of stator assembly 104 such that conduction coil 112 extends about stator tooth 114 and through slots 134. In particular, each conduction coil 112 extends through slots 134 on each side of the respective stator tooth 114. In the exemplary embodiment, bobbins 136 and conduction coils 112 are positioned on every other stator tooth 114.

As shown in FIGS. 3 and 4, stator assembly 104 also includes a plurality of insulation members 150 to insulate components of stator assembly 104, such as annular body 132 and stator teeth 114, from electric current flowing through conduction coil 112. Insulation members 150 are made from a material that is substantially nonconductive. For example, in some embodiments, insulation members 150 are plastic and/or any other material suitable for use as a nonconductive barrier. In alternative embodiments, stator assembly 104 includes any insulation member 150 that enables stator assembly 104 to operate as described herein.

In the exemplary embodiment, insulation members 150 extend into slots 134 between conduction coils 112 and stator teeth 114. More specifically, each conduction coil 112 and insulation member 150 is coupled to a first stator tooth 114 such that insulation member 150 extends between conduction coil 112 and adjacent stator teeth 114. Accordingly, insulation members 150 insulate stator teeth 114 from electric current flowing through conduction coil 112. In the exemplary embodiment, insulation member 150 is separate from bobbin 136 and is coupled to stator tooth 114 prior to coupling bobbins 136 and conduction coils 112 to stator tooth 114. Insulation member 150 is secured between annular body 132 and bobbin 136 when bobbin 136 is coupled to stator tooth 114. In alternative embodiments, insulation member 150 is coupled to stator tooth 114 in any manner that enables stator assembly 104 to operate as described herein.

Referring now to FIGS. 4 and 5, each bobbin 136 also includes an extension tab 152 formed on one of first flange 144 or second flange 146 such that extension tab 152 extends radially beyond a radially inner end 154 or a radially outer end 156 of conduction coil 112. In the exemplary embodiment, extension tab 152 is formed on first flange 144 such that extension tab 144 extends beyond radially outer end 156 of conductor coil 112. In such a configuration, extension tab 144 also extends beyond a radially outer end 158 of second flange 146. Although not shown, in another embodiment, extension tab 152 is formed on second flange 146 such that extension tab 152 extends beyond radially outer end 156 of conductor coil 112 and beyond a radially outer end of first flange 144. In yet another embodiment, extension tab 152 is formed on one of first flange 144 or second flange 146 such that extension tab 152 extends beyond radially inner end 154 of conductor coil 112. In such a configuration, extension tab 152 also extends beyond a radially inner end 160 or 162 of the remaining one of first flange 144 or second flange 146, respectively. Additionally, although only a single extension tab 152 is shown in the accompanying figures, it is contemplated that bobbin 136 may include a plurality of extension tabs 152 that extend radially inward and/or outward from flanges 144 and/or 146.

In the exemplary embodiment shown in FIGS. 4 and 5, extension tab 152 extends radially outward a predetermined distance D beyond radially outer end 158 of second flange 146 such that extension tab 152 covers a wire lead 164 of stator assembly 104. More specifically, extension tab 152 extends radially beyond wire lead 164 such that a radially outer end 166 of extension tab 152 is positioned radially outward from wire lead 164. In the exemplary embodiment, extension tab 152 includes an opening 168 defined therethrough. Opening 168 is substantially radially aligned with central opening 148 of body portion 138 and is positioned radially outward of radially outer end 156 of conductor coil 112. In the exemplary embodiment, opening 168 is configured to receive a lead tie 170 of stator assembly 104. Lead tie 170 secures wire lead 164 to bobbin 136. More specifically, lead tie 170 extends through opening 168 and wraps around wire lead 164 to maintain wire lead 164 in position under extension tab 152 to prevent wire lead 164 from contacting rotor assembly 108 (shown in FIG. 1) in operation of motor assembly 100. The combination of extension tab 152 with opening 168 and lead tie 170 eliminates the need for manual lacing and taping of wire leads 164 during manufacturing.

In the exemplary embodiment, extension tab 152 includes a first side 172 and a second side 174 that is obliquely oriented with respect to first side 172 such that extension tab 152 is substantially trapezoidal in shape. Alternatively, extension tab 152 may have any shape that facilitates operation of bobbin 136 as described herein. Similarly, opening 168 is shown as substantially rectangular in shape. In other embodiments, opening 168 may be any shape that receives lead tie 170 and facilitates operation of bobbin 136 as described herein.

Referring now to FIGS. 6 and 7, in the exemplary embodiment, bobbin body portion 138 includes a plurality retention ribs 176 configured to provide an interference fit between stator tooth 114 and body portion 138. More specifically, body portion 138 includes a radially inner wall 178, a radially outer wall 180, a first circumferential sidewall 182, and a second circumferential sidewall (not shown) that combine to define central opening 148. In the exemplary embodiment, each of radially inner wall 178, radially outer wall 180, first circumferential sidewall 182, and the second circumferential sidewall includes at least one retention rib 176 formed thereon. Walls 178, 180, and 182 may include more than one retention rib 176 and may include different numbers of retention ribs 176. For example, radially inner and outer walls 178 and 180 may include a single retention rib 176, while circumferential sidewalls 182 may include two or three retention ribs 176. In another example, retention ribs 176 are formed only on radially inner and outer walls 178 and 180 or only on first circumferential sidewall 182 and the second circumferential sidewall. Generally, body portion 138 includes any number of retention ribs 176 formed on any combination of a radially inner wall 178, radially outer wall 180, first circumferential sidewall 182, and the second circumferential sidewall that facilitates operation of bobbin 136 as described herein.

In the exemplary embodiment, each retention rib 176 is substantially triangular in shape. More specifically, each retention rib 176 includes a first end 184 having a first thickness T1, a second end 186 having a second thickness T2, and a midpoint 188 having a third thickness T3. As shown in FIG. 7, first and second thicknesses T1 and T2 are substantially similar to each other, while third thickness T3 at midpoint 188 is larger than first and second thicknesses T1 and T2. As such, retention ribs 176 are tapered from ends 184 and 186 to midpoint 188. Such a configuration facilitates sliding bobbin assembly 135 over stator tooth 114. In the exemplary embodiment, retention ribs 176 are integrally formed with body portion 138. Alternatively, retention ribs 176 may be separate components coupled to body portion 138.

In operation, retention ribs 176 contact stator tooth 114 as bobbin assembly 135 is slid onto stator tooth 114 and create an interference fit between stator tooth 114 and bobbin 136. As such, retention ribs 176 facilitate holding bobbin assembly 136 in place on stator tooth during the remainder of assembly of and in operation of motor assembly 100. For example, retention ribs 176 prevent movement of bobbin assembly 135 during the varnishing process to prevent bobbin assembly 135 from sliding axially along stator tooth 116 and into an air gap between stator assembly 104 and rotor assembly 108. As such, retention ribs 176 prevent rotor assembly 108 from striking bobbin assembly 135 during operation of motor assembly 100.

Furthermore, retention ribs 176 create an interference fit with a wide tolerance of stator teeth 114 having slightly different widths and lengths. In operation, a portion of retention rib 176 is deformed (e.g. compressed and/or sheared off) to create a universal interference fit. For example, on smaller stator teeth 114, only a small amount of retention rib 176 is deformed. However, on larger stator teeth 114, a greater amount of retention rib 176 is deformed to create the interference fit. In either case, different amounts of retention ribs 176 are deformed to provide the same interference fit between two different sized stator teeth 114. As such, retention ribs 176 are able to secure different sized stator teeth 114 of the same stator core 110 within bobbins 136. Accordingly, retention ribs 176 eliminate or reduce the risk of reducing the service lifetime of the bobbin 136 during assembly.

The apparatus, methods, and systems described herein provide a bobbin assembly for a stator assembly of an electric motor. The bobbin assembly includes a bobbin having an extension tab and a retention rib. The extension tab extends radially beyond a radial end of a conduction coil and a wire lead of the stator assembly. A lead tie extends through an opening in the extension tab and wraps around the wire lead to maintain the wire lead in position under the extension tab to prevent the wire lead from contacting the rotor assembly in operation of the motor assembly. As such, the extension tab eliminates the need for manual lacing and taping of the wire leads during manufacturing, thus reducing labor and materials costs and increasing the rate of manufacturing.

Furthermore, the bobbin assembly also includes a plurality of retention ribs that extend inward from the body portion of the bobbin to create an interference fit between the stator tooth and the bobbin. As such, the retention ribs facilitate holding the bobbin assembly in place on the stator tooth during the remainder of assembly of and in operation of the motor assembly.

Exemplary embodiments of an electric motor assembly are described above in detail. The electric motor assembly and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bobbin assembly for use in a stator assembly for a motor assembly having an axis of rotation, said bobbin assembly comprising:
   a conductor coil comprising a radially inner end and a radially outer end; and
   a bobbin comprising:
      a body portion comprising a first end and a second end, wherein said conductor coil is coupled about said body portion;
      a first flange coupled to said first end;
      a second flange coupled to said second end;
      at least one extension tab formed on one of said first flange or said second flange, wherein said at least one extension tab extends radially beyond said radially outer end of said conductor coil, and wherein said at least one extension tab extends radially beyond a radially outer end of the remaining the first flange or second flange on which it is not formed, wherein a radially outer end of said at least one extension tab is tapered.

2. The bobbin in accordance with claim 1, wherein said at least one extension tab is formed on said first flange such that said extension tab extends beyond said radially outer end of said conductor coil.

3. The bobbin in accordance with claim 2, wherein said at least one extension tab extends beyond a radially outer end of said second flange.

4. The bobbin in accordance with claim 1, wherein said at least one extension tab is formed on said second flange such that said extension tab extends beyond a radially outer end of said conductor coil.

5. The bobbin in accordance with claim 4, wherein said at least one extension tab extends beyond a radially outer end of said first flange.

6. The bobbin in accordance with claim 1, wherein said at least one extension tab comprises an opening configured to receive a lead tie, wherein said extension tab extends beyond a radially outer end of said opening.

7. The bobbin in accordance with claim 6, wherein said opening is positioned radially outward of said radially outer end of said conductor coil.

8. The bobbin in accordance with claim 6, wherein said body portion defines a central opening configured to receive a stator tooth, wherein said at least one extension tab opening is radially aligned with said central opening.

9. The bobbin in accordance with claim 1, wherein said at least one extension tab is formed on one of said first flange or said second flange such that said at least one extension tab extends beyond said radially inner end of said conductor coil.

10. The bobbin in accordance with claim 9, wherein said at least one extension tab extends beyond a radially inner end of said remaining one of said first flange or said second flange.

11. The bobbin in accordance with claim 1, wherein said at least one extension tab extends radially beyond at least one wiring lead of the stator assembly.

12. A stator assembly for use in a motor assembly having an axis of rotation, said stator assembly comprising:
   an annular body extending about said axis;
   a plurality of stator teeth extending axially from said annular body and spaced circumferentially about said annular body;

at least one bobbin coupled to a stator tooth of said plurality of stator teeth, said at least one bobbin comprising a body portion defining an opening therethrough configured to receive said stator tooth, wherein said body portion comprises at least one retention rib configured to provide an interference fit between said stator tooth and said body portion; and a conductor coil coupled about said body portion and comprising a radially inner end and a radially outer end, wherein said body portion comprises a first end and a second end, wherein said at least one bobbin comprises:

a first flange coupled to said first end;

a second flange coupled to said second end; and at least one extension tab formed on one of said first flange or said second flange, wherein said at least one extension tab extends radially beyond said radially outer end of said conductor coil, and wherein said at least one extension tab extends radially beyond a radially outer end of the remaining the first flange or second flange on which it is not formed, wherein a radially outer end of said at least one extension tab is tapered.

13. The stator assembly in accordance with claim 12, wherein said at least one bobbin comprises a radially inner wall, a radially outer wall, a first circumferential sidewall, and a second circumferential sidewall.

14. The stator assembly in accordance with claim 13, wherein said at least one retention rib comprises at least one retention rib formed on each of said radially inner wall, said radially outer wall, said first circumferential sidewall, and said second circumferential sidewall.

15. The stator assembly in accordance with claim 13, wherein said at least one retention rib comprises at least one retention rib formed on each of said radially inner wall and said radially outer wall.

16. The stator assembly in accordance with claim 13 wherein said at least one retention rib comprises at least one retention rib formed on each of said first circumferential sidewall and said second circumferential sidewall.

17. The stator assembly in accordance with claim 12, wherein said at least one retention rib comprises a first end having a first thickness, a second end having a second thickness, and a midpoint having a third thickness greater than the first thickness and the second thickness.

18. The stator assembly in accordance with claim 12 further comprising:

at least one wire lead at least partially circumscribing said plurality of stator teeth; and a lead tie configured to couple said at least one wire lead to said at least one extension tab, wherein said at least one extension tab extends radially beyond said at least one wire lead and comprises an opening configured to receive the lead tie.

19. A bobbin assembly for use in a stator assembly for a motor assembly having an axis of rotation, said bobbin assembly comprising:

a conductor coil comprising a radially inner end and a radially outer end; and a bobbin comprising:

a body portion comprising a first end and a second end, wherein said conductor coil is coupled about said body portion;

a first flange coupled to said first end;

a second flange coupled to said second end;

at least one extension tab formed on one of said first flange or said second flange, wherein said at least one extension tab extends radially beyond one of said radially inner end or radially outer end of said conductor coil, and wherein said at least one extension tab extends radially beyond a radially outer end of the remaining the first flange or second flange on which it is not formed, wherein said at least one extension tab comprises an opening configured to receive a lead tie, wherein said extension tab extends beyond a radially outer end of said opening.

20. The bobbin in accordance with claim 6, wherein said opening is positioned radially outward of said radially outer end of said conductor coil.

21. The bobbin in accordance with claim 6, wherein said body portion defines a central opening configured to receive a stator tooth, wherein said at least one extension tab opening is radially aligned with said central opening.

22. The bobbin in accordance with claim 1, wherein said at least one extension tab is formed on said first flange such that said extension tab extends beyond said radially outer end of said conductor coil.

* * * * *